United States Patent [19]
Bergthaller et al.

[11] Patent Number: 5,855,657
[45] Date of Patent: Jan. 5, 1999

[54] INKJET INK

[75] Inventors: Peter Bergthaller, Bergisch Gladbach; Stefan Herrmann, Bonn, both of Germany

[73] Assignee: Agfa-Gevaert AG, Germany

[21] Appl. No.: 923,139

[22] Filed: Sep. 4, 1997

[30] Foreign Application Priority Data

Sep. 12, 1996 [DE] Germany .......... 196 37 016.7

[51] Int. Cl.$^6$ .................. C09D 11/02
[52] U.S. Cl. .................. 106/31.57; 106/31.43; 106/31.46; 106/31.49; 106/31.58; 106/31.75; 106/31.76; 106/31.78; 106/31.87
[58] Field of Search .......... 106/31.57, 31.58, 106/31.43, 31.46, 31.49, 31.87, 31.86, 31.75, 31.76, 31.78

[56] References Cited

U.S. PATENT DOCUMENTS

| | | | |
|---|---|---|---|
| 4,500,355 | 2/1985 | Shimada et al. | 106/31.58 |
| 4,620,876 | 11/1986 | Fujii et al. | 106/31.58 |
| 5,706,042 | 1/1998 | Takeyama et al. | 106/31.43 |

*Primary Examiner*—Helene Klemanski
*Attorney, Agent, or Firm*—Connolly & Hutz

[57] ABSTRACT

An inkjet ink results in improved color-fastness if the ink contains a water-soluble inorganic thiosulphate, trithionate or tetrathionate or an organic thiosulphate, in an amount of 0.2 to 8% by weight with respect to the ink base.

7 Claims, No Drawings

INKJET INK

This invention relates to an ink for the production of inkjet images which is sprayed on to a suitable recording material in a fine jet, which is imagewise modulated. The recording material comprises a transparent, semi-transparent or opaque support and an image receiving layer coated thereon.

The inkjet process is known (see the chapter "Ink Jet Printing" by R. W. Kenyon in "Chemistry and Technology of Printing and Imaging Systems", edited by Peter Gregory, Blackie Academic & Professional, Chapman & Hall 1996, pages 113 to 138, and the literature cited therein, for example).

It is known that the light-fastness of images which are produced by the inkjet process is insufficient, and cannot compete, for example, with the light-fastness of color photographic images which are produced by the conventional chromogenic process on color photographic paper. The object of the present invention is to remedy this deficiency in light-fastness and to make the light-fastness of inkjet images the same as the light-fastness of color photographs.

The light-fastness of inkjet copies is by no means equally poor for all single colors; rather, it is strongly dependent on the nature of the dye used. Thus yellow colors based on azo dyes with a pyrazolone basis are still moderately light-fast, for example. In contrast, magenta dyes based on rhodamines are only light-fast to an unsatisfactory extent, and cyan dyes based on triphenylmethane are likewise comparatively unstable to light. Cyan dyes based on water-soluble phthalocyanine derivatives are very light-stable, however. Magenta-coloured dyes from the class comprising acyl-H-acid derivatives occupy a position in the middle.

The object of the present invention is to improve the light-fastness of all the said classes of dyes as extensively as possible.

Surprisingly, it has been found that this is possible in a simple manner if the ink for the inkjet process contains 0.2 to 8% by weight, with respect to the ink basis, of an inorganic thiosulphate, trithionate or tetrathionate which is soluble in the ink, or of an organic thiosulphate.

The ink basis is the solvent or solvent mixture in which the compounds according to the invention are dissolved and the dyes are dissolved or dispersed, and which may contain other additives and auxiliary materials.

Alkali thiosulphates, or those ammonium thiosulphates which do not release volatile amines in contact with alkaline inks, are preferably used as thiosulphates. They may also be salts of oligomeric or polymeric ammonium ions, e.g. polymeric diallylammonium salts. The tetrathionate ion may also be present bonded to high molecular weight ammonium ions.

So-called "Bunte"-salts are used as organic thiosulphates. The preferred Bunte-salts are those which do not release volatile thiols or disulphides on hydrolysis by acid or alkali. Particularly advantageous Bunte-salts can be obtained, for example, from salts of chloroacetic acid, from chloroacetamide or from analogous α-choroalkanoic acid derivatives; they can also be produced in the corresponding layer by the reaction of a corresponding alkyating agent with an alkali thiosulphate. The synthesis of Bunte-salts is described by H. Distler, Angew. Chem. 79, page 520 (1967), for example.

The Bunte-salt can also exist in the form of an internal salt, which contains a primary, secondary, tertiary or quaternary ammonium function as a counterion for the thiosulphate group. The thiosulphate or Bunte-salt may also be present bonded to a cation exchanger which is deposited in the form of particles and which contains tertiary or quaternary ammonium groups.

The preferred organic thiosulphates ("Bunte"-salts) correspond to general formula I

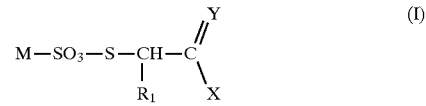

wherein

M represents an alkali metal or ammonium, $R_1$ represents H, alkyl or aryl,

Y represents O or N-Z,

X represents OH, OM or an unsubstituted, mono-substituted or di-substituted amide group on the nitrogen, or which represents, together with Z, the remaining members of a 5- or 7-membered heterocycle, and Z represents, together with X, the remaining members of a 5- or 7-membered heterocycle.

Organic thiosulphates (Bunte salts) according to the invention:

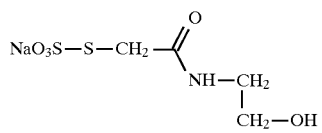

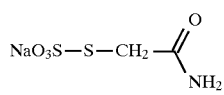

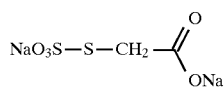

-continued
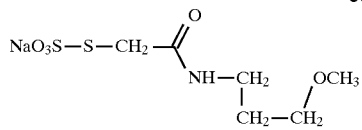 4.
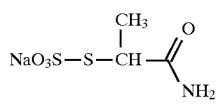 5.
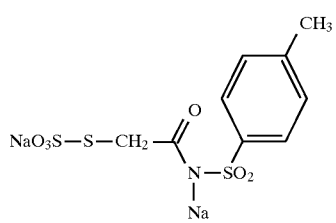 6.
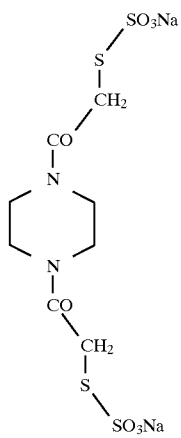 7.
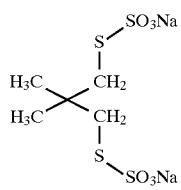 8.
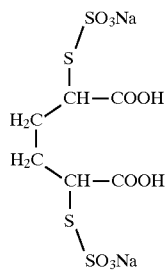 9.
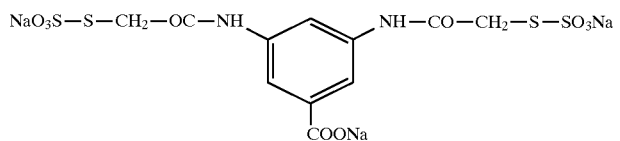 10.
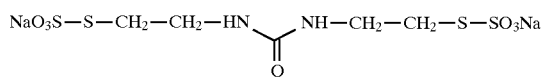 11.
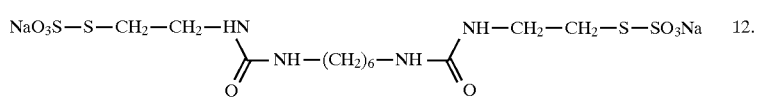 12.

In general, the admixture of thiosulphates has no disadvantage effect on the properties of the basic ink. The amount of thiosulphate can easily be adjusted so that, in the finished image, the salt does not crystallise out and the properties of the receiving material are not impaired.

Commercially available copier paper can be used as the receiving material. When stringent demands are made on the ink-based image, a specially developed material which contains an image receiving layer on a support can also be used. The support can be transparent or opaque.

The layer which receives the ink-based image preferably consists of a protein., e.g. of hardened gelatine, of casein or albumin, of a cellulose- or polyvinyl alcohol derivative, or of an acrylamide copolymer which contains both acidic and basic groups. Hydrophilic silica gels also produce very advantageous image receiving layers. It is also possible to improve the feel of the material by incorporating silica gel particles.

The light-fastness of the inkjet prints is particularly improved when the image receiving layer contains a non-volatile alkylated phenol in the form of a fine particulate dispersion.

Nonvolatile, alkylated phenols which are particularly suitable are di- or trialkyl phenols, the alkyl groups of which together contain at least 4 C atoms, e.g. 2,4-di-tert.-butylphenol or 3,4-di-tert.-amylphenol.

Since the Bunte-salts for the most part have a bactericidal and fungicidal effect, the addition to the ink of a preservative which is necessary per se is frequently dispensed with.

EXAMPLES

Color inks were produced by dissolving the constituents given in the examples below, with stirring, in 100 ml deionised water in each case. After standing for one hour, the ink was filtered through a membrane filter (pore width 1 μm) and used to fill a Hewlett Packard Type HP 51625A color cartridge.

The inks contained the following dyes:

yellow: dye A (acid yellow 23), magenta: a 1:1 mixture of dyes B and C cyan: a 1:1 mixture of dyes D (direct blue 86) and E

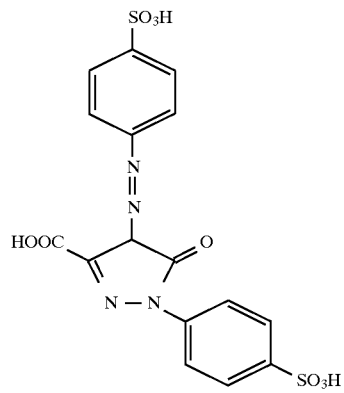

Dye A

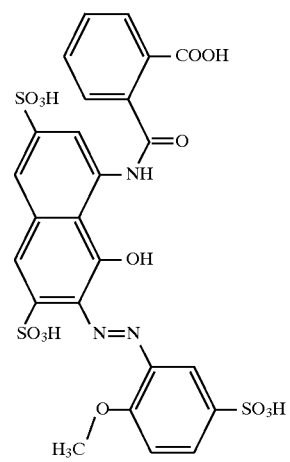

Dye B

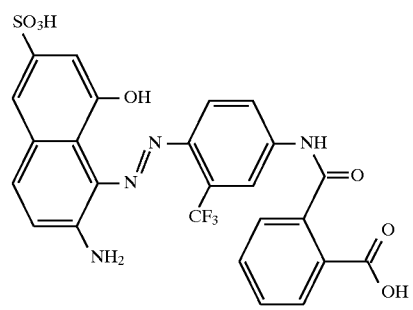

Dye C

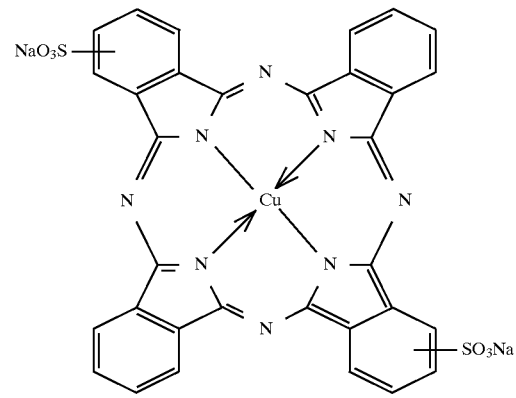

Dye D

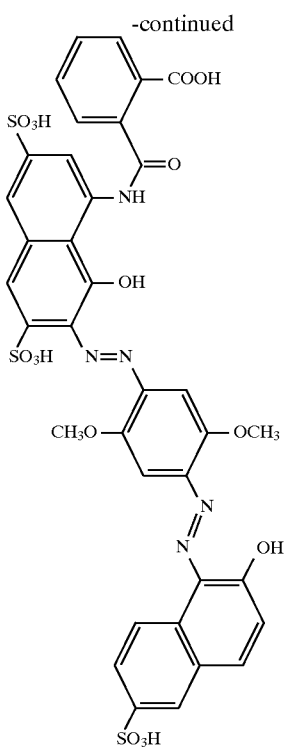

Dye E

Example 1
4.8 g yellow dye
12.8 ml diethylene glycol
0.8 g Bunte-salt 2
Example 2
as in Example 1, except that 1.3 g Bunte-salt 13 was used instead of Bunte-salt 2
Example 3
as in Example 1, except that 2.1 g Bunte-salt 21 was used instead of Bunte-salt 2
Example 4
as in Example 1, except that no Bunte-salt was added (comparison)
Example 5
4.1 g of the magenta dye mixture
10.5 ml diethylene glycol
0.8 g Bunte-salt 2
Example 6
as in Example 5, except that 1.3 g Bunte-salt 13 was used instead of Bunte-salt 2
Example 7
as in Example 5, except that 2.1 g Bunte-salt 21 was used instead of Bunte-salt 2
Example 8
as in Example 5, except that no Bunte-salt was added (comparison)
Example 9
2.9 g of the cyan dye mixture
10.4 ml diethylene glycol
0.8 g Bunte-salt 2
Example 10
as in Example 9, except that 1.3 g Bunte-salt 13 was used instead of Bunte-salt 2
Example 11
as in Example 9, except that 2.1 g Bunte-salt 21 was used instead of Bunte-salt 2
Example 12
as in Example 9, except that no Bunte-salt was added (comparison)

Testing: a colored area was printed at full density with the ink to be tested in each case on a sheet of commercially available copier paper with a weight of 80 g/m$^2$, using an BP 560C printer. In addition, sheets were printed with simple mixed colors (two inks of different color, each with the same Bunte-salt) and with composite black (all three colored dyes).

The sheets were halved and one half of each sheet was exposed to the sun for three weeks in an east-facing window. This was then compared with the other half, which had been stored in the dark, in each case. The comparison was made by measuring the density of the reflected light at ten points in the colored area in each case, and averaging.

TABLE

Density loss (in %) in the colored area as measured behind a corresponding additive color filter

| | Filter | Example | | | | | Filter | Examples | | | |
|---|---|---|---|---|---|---|---|---|---|---|---|
| yellow | | 1 | 2 | 3 | 4 | red | | 1 + 5 | 2 + 6 | 3 + 7 | 4 + 8 |
| | bF | 26 | 22 | 30 | 60 | (g + p) | bF | 25 | 23 | 28 | 58 |
| | | | | | | | gF | 33 | 30 | 33 | 60 |
| magenta | | 5 | 6 | 7 | 8 | green | | 1 + 9 | 2 + 10 | 3 + 11 | 4 + 12 |
| | gF | 37 | 35 | 38 | 65 | (g + b) | bF | 25 | 24 | 27 | 57 |
| | | | | | | | rF | 25 | 25 | 37 | 58 |
| cyan | | 9 | 10 | 11 | 12 | blue | | 5 + 9 | 6 + 10 | 7 + 11 | 8 + 12 |
| | rF | 22 | 25 | 40 | 60 | (p + b) | gF | 34 | 32 | 33 | 62 |
| | | | | | | | rF | 22 | 25 | 35 | 57 |
| | | | | | | black | | 1 + 5 + 9 | 2 + 6 + 10 | 3 + 7 + 11 | 4 + 8 + 12 |
| | | | | | | (y + m + c) | bF | 28 | 23 | 29 | 63 |
| | | | | | | | gF | 40 | 36 | 42 | 69 |
| | | | | | | | rF | 22 | 26 | 40 | 62 |

Underlined numbers: numbers of the example inks; italic numbers: measured values.
The meanings of the abbreviations used are:
y: yellow, m: magenta, c: cyan;
bF: blue filter, gF: green filter, rF: red filter

We claim:
1. An ink for the inkjet process, which contains 0.2 to 8% by weight, with respect to the ink base, of an inorganic, trithionate or tetrathionate which is soluble in the ink, or of an organic thiosulphate.

2. The inkjet ink according to claim 1, wherein the organic thiosulphate corresponds to the formula

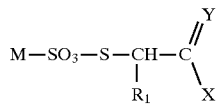

wherein

M is an alkali metal or ammonium,
$R_1$ is H, alkyl or aryl,
Y is O or N-Z,
X is OH, OM or an unsubstituted, mono-substituted or disubstituted amide group on the nitrogen, or which represents, together with Z, the remaining members of a 5- or 7-membered heterocycle, and
Z is, together with X, the remaining members of a 5- or 7-membered heterocycle.

3. The inkjet as claimed in claim 2, wherein M is Na.

4. The inkjet according to claim 2, wherein said inkjet contains an organic thiosulphate which is selected from the group consisting of

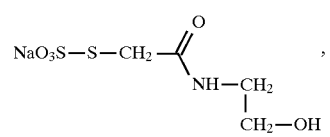

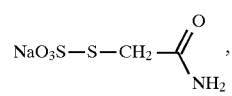

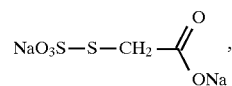

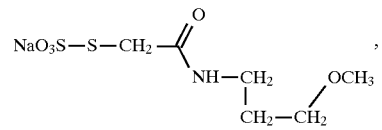

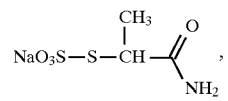

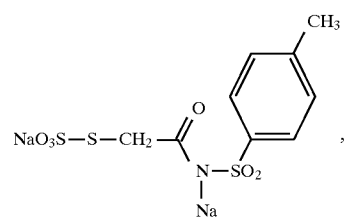

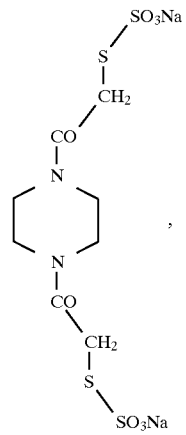

-continued
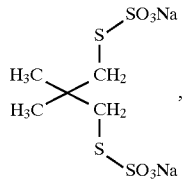
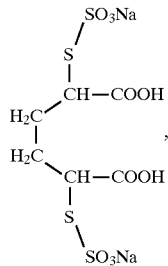
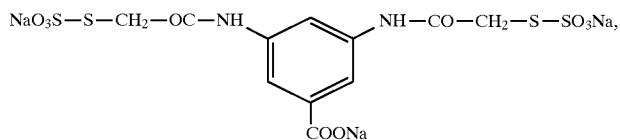
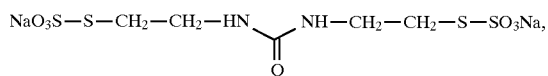
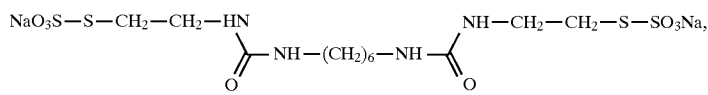
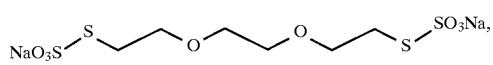
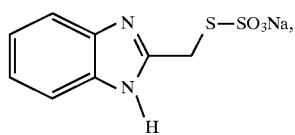
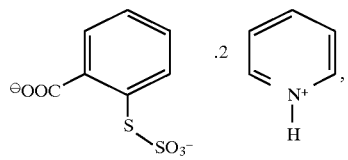
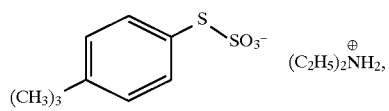
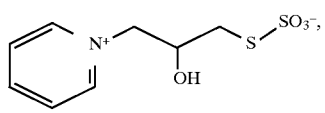
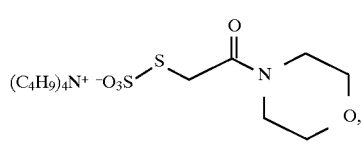
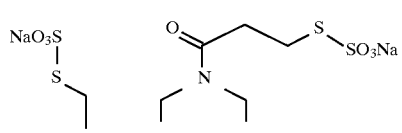

5. A recording material which comprises a support and an image receiving layer coated on said support, wherein said image receiving layer contains an image with said recording ink as claimed in claim 1.

6. The recording material as claimed in claim 5, wherein said support is transparent or opaque.

7. A process for inkjet printing which comprises spraying the ink as claimed in claim 1 on a recording material.

* * * * *